(12) United States Patent
Ferguson

(10) Patent No.: US 7,405,747 B2
(45) Date of Patent: Jul. 29, 2008

(54) EXTENDED K2T MEASUREMENT OF VIDEO

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 503 days.

(21) Appl. No.: 11/089,959

(22) Filed: Mar. 25, 2005

(65) Prior Publication Data

US 2005/0231594 A1     Oct. 20, 2005

Related U.S. Application Data

(60) Provisional application No. 60/562,467, filed on Apr. 14, 2004.

(51) Int. Cl.
*H04N 17/00* (2006.01)

(52) U.S. Cl. .................. 348/180; 348/185; 348/189

(58) Field of Classification Search ........... 348/180, 348/181, 185, 189; 455/115.1, 67.11, 115.2, 455/226.1; 375/224
See application file for complete search history.

(56) References Cited

U.S. PATENT DOCUMENTS

| | | | | |
|---|---|---|---|---|
| 6,678,424 B1 * | 1/2004 | Ferguson | | 382/286 |
| 6,690,839 B1 * | 2/2004 | Ferguson | | 382/274 |
| 6,734,898 B2 * | 5/2004 | Zeidler | | 348/183 |
| 6,798,919 B2 * | 9/2004 | Ali et al. | | 382/272 |
| 6,822,675 B2 * | 11/2004 | Jung et al. | | 348/180 |
| 6,829,005 B2 * | 12/2004 | Ferguson | | 348/180 |
| 6,907,143 B2 * | 6/2005 | Ferguson | | 382/261 |
| 6,941,017 B2 * | 9/2005 | Ferguson | | 382/210 |
| 6,975,776 B2 * | 12/2005 | Ferguson | | 382/260 |
| 7,038,710 B2 * | 5/2006 | Caviedes | | 348/180 |
| 7,069,167 B2 * | 6/2006 | Ferguson | | 702/109 |
| 7,151,559 B2 * | 12/2006 | Matsuda | | 348/180 |
| 7,180,537 B2 * | 2/2007 | Ferguson | | 348/180 |
| 2003/0031281 A1 * | 2/2003 | Ferguson | | 375/350 |
| 2003/0179242 A1 * | 9/2003 | Alexander et al. | | 345/781 |
| 2005/0233702 A1 * | 10/2005 | Ferguson | | 455/67.14 |

* cited by examiner

*Primary Examiner*—David Ometz
*Assistant Examiner*—Jean W Désir
(74) *Attorney, Agent, or Firm*—Francis I. Gray

(57) ABSTRACT

K2T measurement of video signals, regardless of video format, is determined by generating a graticule using an algorithm having a single variable that is a function of the video format for the particular video signal. The graticule is set to a normalized value of one for a range of +/−T, where T is a function of the video format. The graticule is set to a normalized value over a range of +/−(1.5T to flatBreak) according to a human vision masking model algorithm expressed as K+C/t, where K is a constant K factor, t is a function of T, and C is the single variable that is a function of the video format. The normalized value of the graticule beyond a point designated by flatBreak is a constant=K. Finally a linear curve fit between one and K+C/t over the range of +/−(T to 1.5T) sets the remaining values for the graticule.

2 Claims, 9 Drawing Sheets

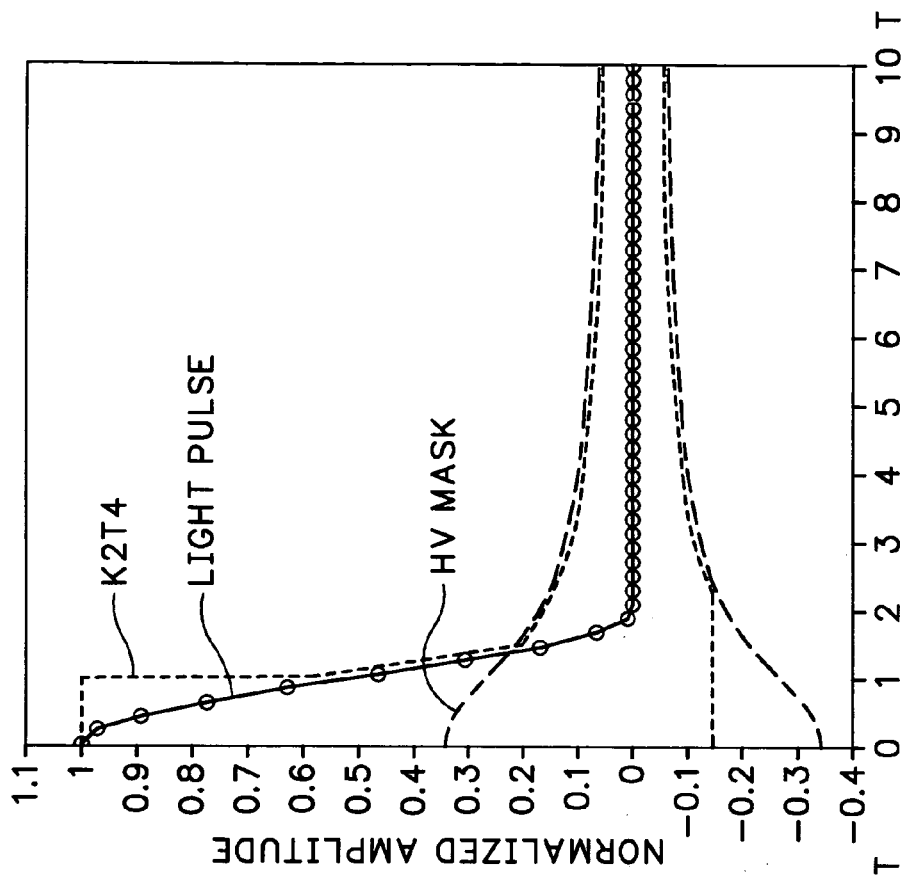
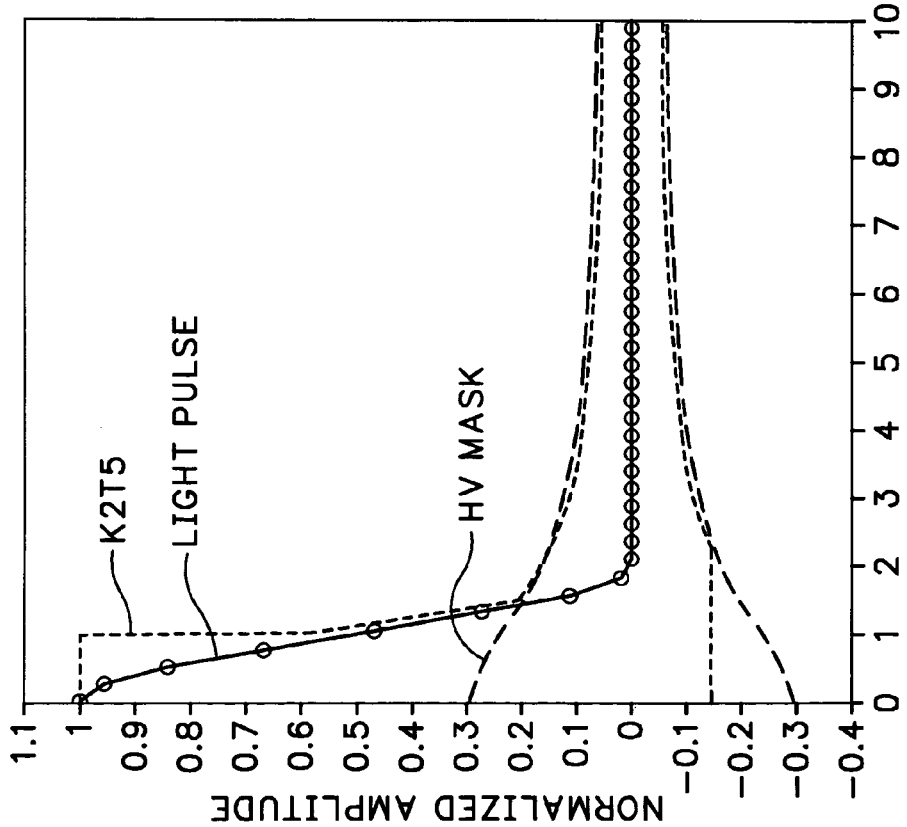

EXTENDED K2T MEASUREMENT OF VIDEO

CROSS-REFERENCE TO RELATED CASES

This application claims the benefit of U.S. Provisional Application No. 60/562,467, filed on Apr. 14, 2004, entitled Extended K2T Measurement of Video, which application is hereby incorporated herein by reference.

BACKGROUND OF THE INVENTION

The present invention relates to the measurement of characteristics of a video signal, and more particularly to K2T measurement of video signals extended to formats other than standard definition television (SDTV).

The problem addressed is how to extrapolate a subjectively correlated standard method of objectively measuring video quality degradation due to linear distortions for standard definition television (SDTV) to other video formats, such as high definition television (HDTV) and computer video for example. In other words there is a need to predict subjective quality at these other video formats.

Linear distortions are important in analog video testing because they can directly and indirectly cause visible degradation. A virtually infinite combination of the linear distortions, such as amplitude and delay versus frequency, can have a similar impact on the perceived quality in video. For objective measurements of the impact of linear distortions on video quality, the approach has been to use a test pulse with a limit template to calculate the gain ratio (graticule to test signal) required to contain the video signal within the graticule. A K Factor rating system is used to map linear distortions of 2T sine-squared pulses, that are themselves bandwidth limited, onto subjectively determined scales of picture quality. The sine-squared pulses are specified in terms of half amplitude duration (HAD), which is the pulse width measured at 50% of the pulse amplitude. T is the Nyquist interval, or $1/f_c$ where $f_c$ is the cutoff frequency of the system to be measured. K2T is a weighted function of the amplitude and time of the distortions occurring before and after the 2T pulse. This ratio in percent correlates well to subjective quality ratings of video impaired by linear distortions. See C. A. Siocos and G. Chouinard, "SUBJECTIVE IMPAIRMENT UNITS IN RELATION WITH OSCILLOSCOPE GRATICULES FOR EVALUATING SHORT-TIME LINEAR WAVEFORM DISTORTIONS," IEEE Transactions on Broadcasting, Vol. BC-25, No. 2, Jun. 1979.

As mentioned above, the prior approach has been to use a test pulse, such as that shown in FIG. 1 where the half amplitude duration (HAD) is 2 times T, with a limit template as shown in FIG. 2 to calculate the gain ratio, either graticule or test signal, required to contain the video signal within the graticule. FIG. 2 shows an example of a K2T graticule according to CCIR Recommendation 451 vertically normalized to 2T pulse amplitude and horizontally normalized to T. The right of pulse center is shown, but the limits apply equally to both the left and right side of pulse center. This ratio multiplied by a K factor of the nominal graticule, such as 0.04 specified in CCIR Recommendation 451, in percent (K2T %) becomes the measurement result. Graticules and associated automated measurements meeting this specification have been implemented in analog, digital and software forms. The Tektronix® VM700 and VM100 video measurement products both include implementations of this graticule for standard definition K2T measurements.

However standards do not yet exist for graticules in other video formats, such as high definition and computer video. The standard definition (SD) graticule specifications are specified for a much lower bandwidth than the high definition (HD) and computer video formats require. Simply using bandwidth ratios of new and old formats to scale graticules of the existing standard does not give the intended result. The test pulse is designed to contain spectral content approximately up to the bandwidth limit, approximately 1/T, of the format. Simply scaling the existing standard graticule using the new T value results in a measurement that does not track visual sensitivity to impairments, as shown in FIG. 3 where both the old CCIR graticule is shown scaled for HD and the new graticule for HD calculated according to the present invention, as explained below, is shown. For example the high definition 2T30 pulse is so narrow that under standard viewing conditions the eye is much less sensitive to impairments than the same time normalized impairments. And finally, re-scaling according to line time, as described in U.S. Patent Publication No. 2003-0160515-A1, is not sufficient because the re-scaled graticule does not correspond to the difference in test signal spectrum—see FIG. 4. The spectrum (normalized approximate luminance in dB relative to max vs. spatial frequency or sequency in units of cycles per visual degree) of 2T4 MHz Pulse (SD) vs. 2T30 MHz Pulse (HD) shows the comparison of visual stimulus of SD vs. HD 2T pulses under comparable viewing conditions. Since human vision sensitivity is a function of spatial frequency, the associated graticule for HD needs to be modified in a non-uniform manner rather than simply being time scaled.

What is required is a perceptually consistent K2T measurement algorithm to summarize the video quality impact of linear distortions present in analog video and equivalent digital representations across multiple formats, and in particular to have one method of measurement for standard definition as well as other formats including high definition and computer video with various T, sample rate, samples per line and aspect ratio parameters.

BRIEF SUMMARY OF THE INVENTION

Accordingly the present invention provides K2T measurements of video for all video formats, including standard definition, high definition and computer video formats. The graticule for K2T measurement of video signals, regardless of video format, is determined by using an algorithm having a single variable that is a function of the video format for the particular video signal. The graticule is set to a normalized value of one for the range of +/−T, where T is a function of the video format. The graticule is expressed as K+C/t, where K is a constant K factor, t is a function of T, and C is the single variable that is a function of the video format, which graticule is set to a normalized value over the range of +/−(1.5T to flatBreak) according to a human vision masking model algorithm. The normalized value of the graticule beyond a point designated by flatBreak is set to a constant. Finally a linear curve fit between one and K+C/t over the range of +/−(T to 1.5T) sets the remaining values for the graticule.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 17 is a graphic view of a new graticule summarized for a 576i video format according to the present invention.

FIG. 18 is a graphic view of a new graticule summarized for a 480i video format according to the present invention.

DETAILED DESCRIPTION OF THE INVENTION

Figure 2:
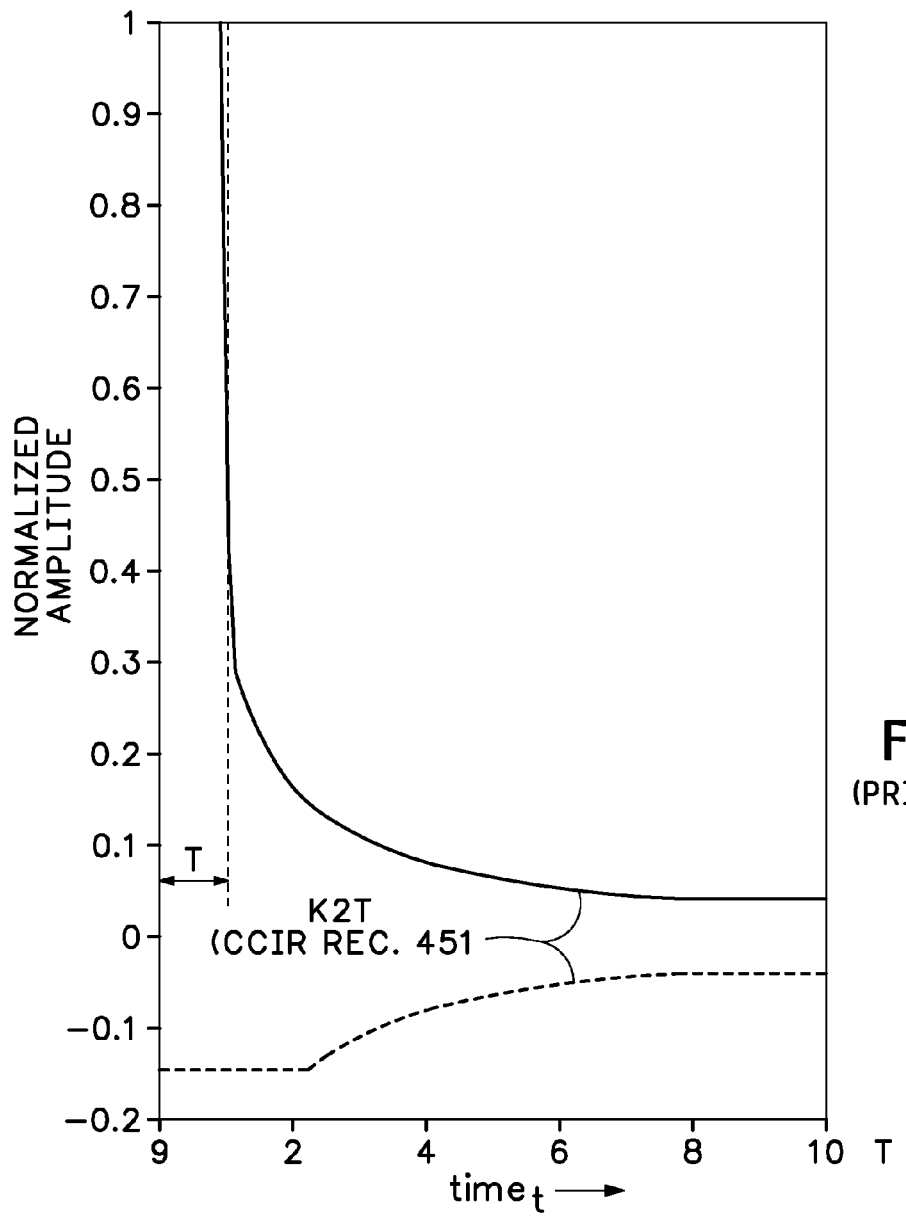
FIG. 2 is a graphic view of a K2T graticule according to the prior art as specified in CCIR Recommendation 451.
Figure 3:
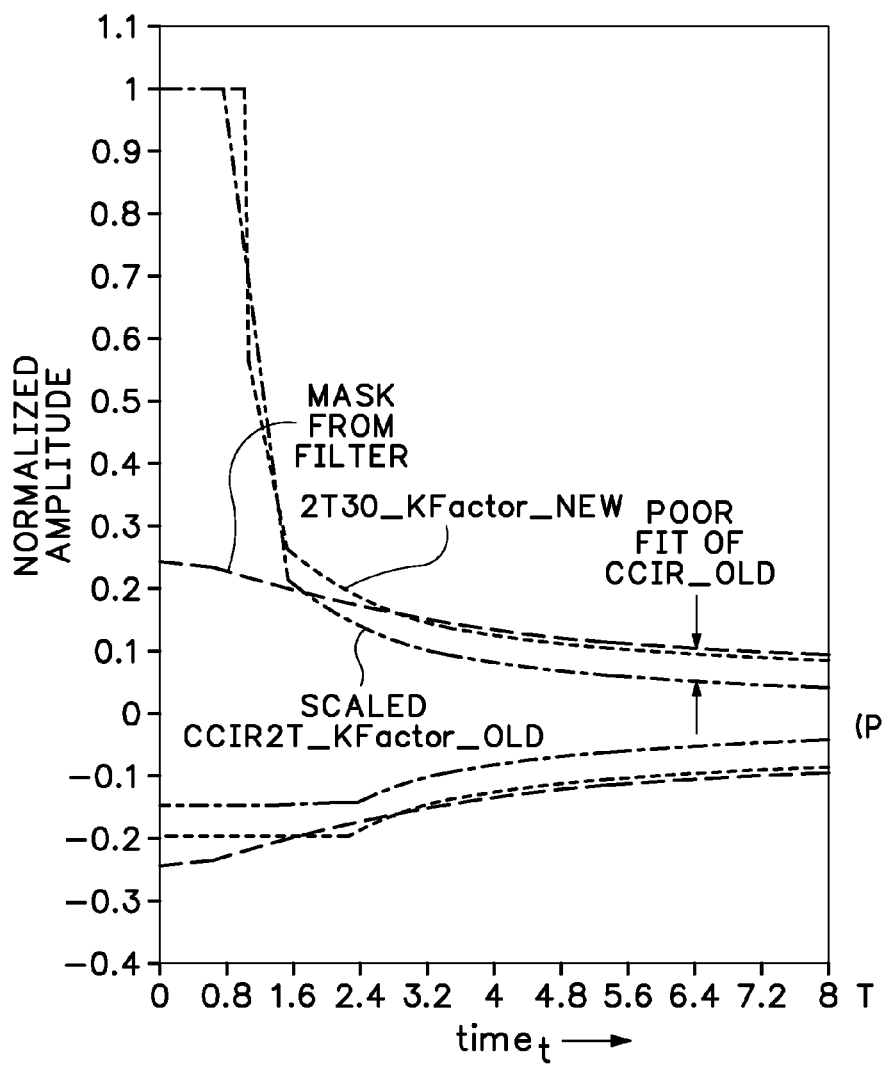
FIG. 3 is a graphic view of a poor fit of an existing standard definition graticule scaled to an HD T.
Figure 4:
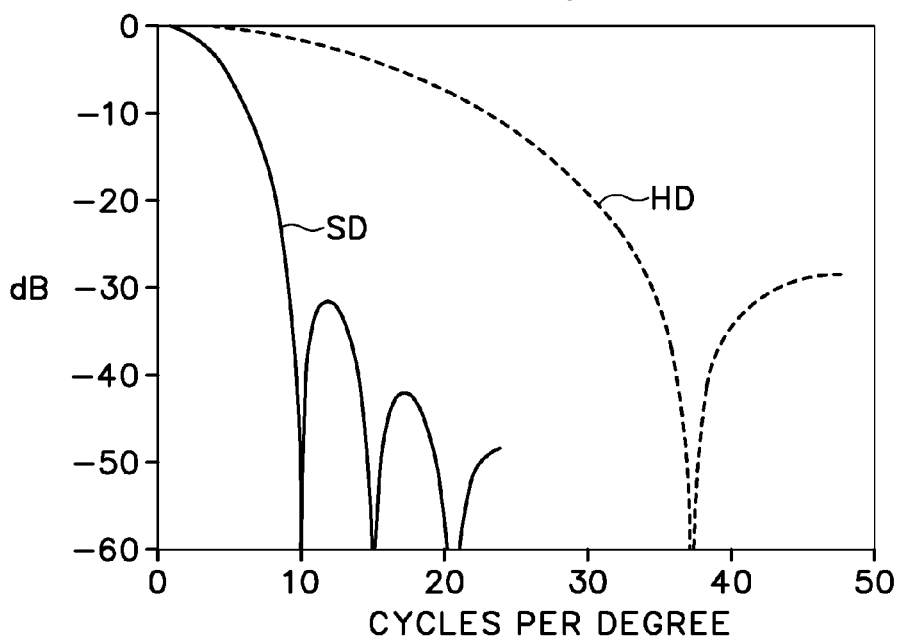
FIG. 4 is a graphic view of the comparison of visual stimulus of standard definition versus high definition 2T pulses under comparable viewing conditions.
Figure 5:
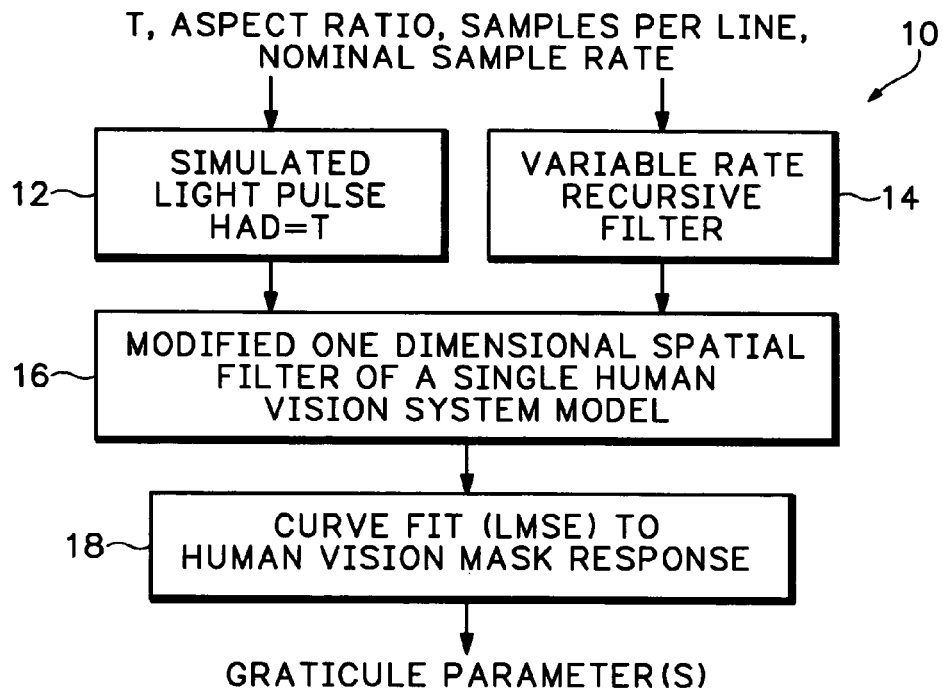
FIG. 5 is a block diagram of an apparatus according to the present invention for creating graticules for K2T measurement in non-standard definition video formats.

Referring now to FIG. 5 an apparatus 10 is shown that creates a graticule beyond a +/−T portion. Over the range of +/−T the graticule is maximum, normalized to one, by all existing standards as in FIG. 2. Many automated methods only use the +/−2T portion of the graticule. To produce this curve in the present invention appropriate masking components of the human vision masking model used in U.S. Patent Publication No. 2003-0152284-A1 are used to:

1) predict the graticule used in the existing standard definition (CCIR) standard to validate the use of a simplified model for this purpose, and
2) use this same simplified model to create a unique graticule for any new video format.

U.S. Patent Publication No. 2003-0152284-A1 includes more than needed for this purpose since it accounts for vertical, horizontal and temporal frequency sensitivity and adaptations according to local intensities in each dimension, as well as many visual illusions not relevant to the pulse stimulus. Full human vision perceptual difference model components and intermediate signals include:

| | |
|---|---|
| reference adaptive center filter | test adaptive center filter |
| reference adaptive surround filter | test adaptive surround filter |
| DC product | correlation |
| AC difference | AC sum |
| DC sum | area threshold |
| summer | nonlinear normalization |

Figure 6:
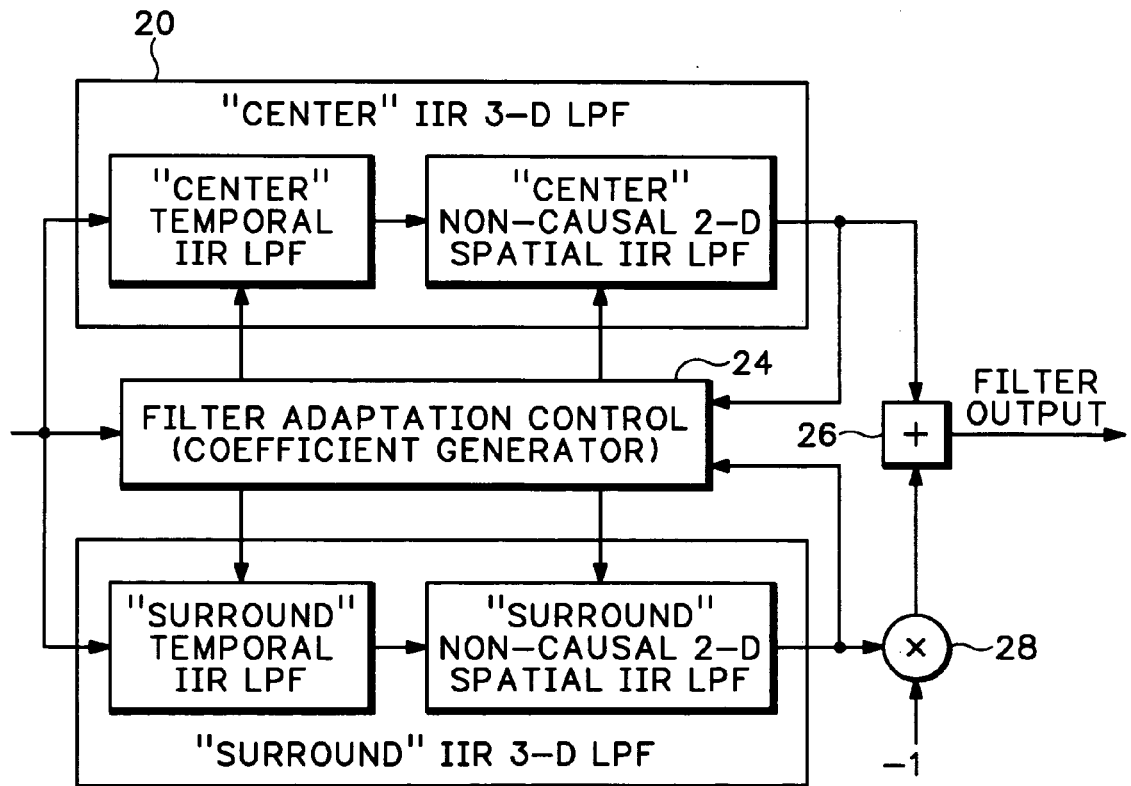
FIG. 6 is a block diagram view of an adaptive spatio-temporal filter of a single human vision system model.
Figure 7:
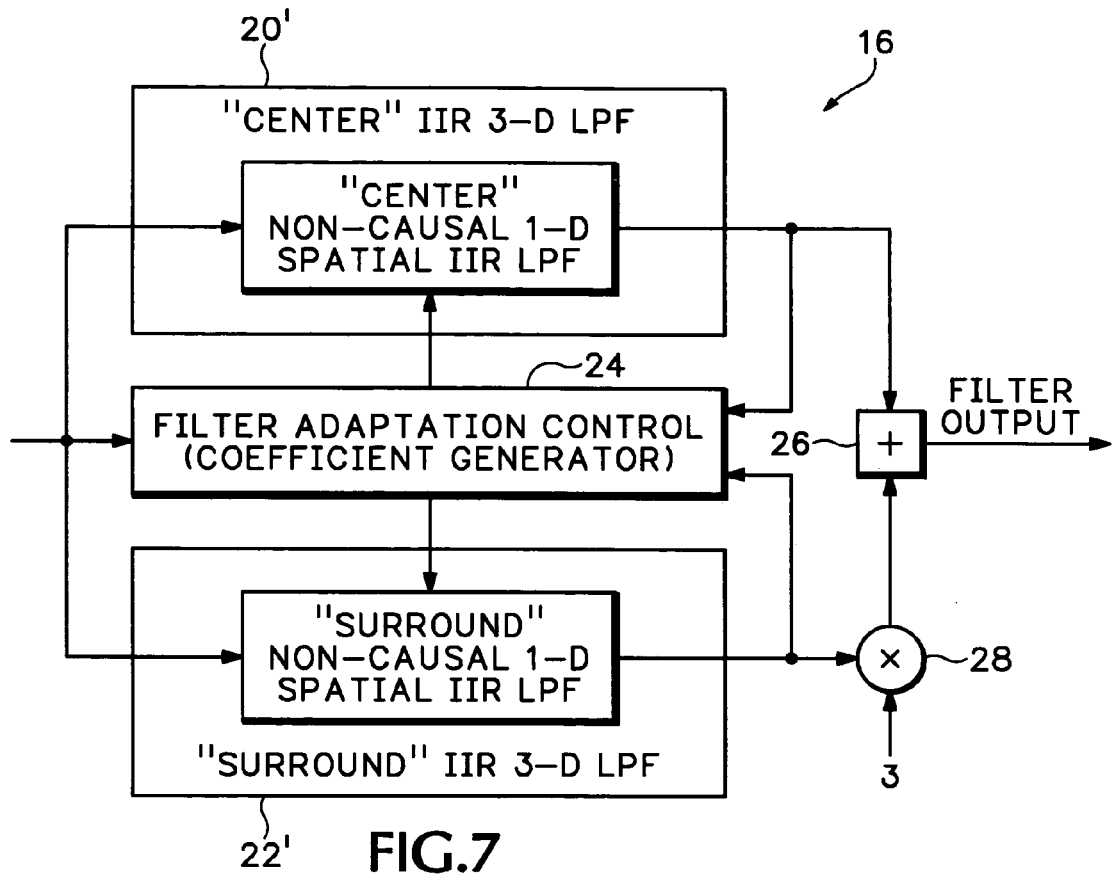
FIG. 7 is a block diagram view of a modified one-dimensional spatial filter of a single human vision system model.
Figure 8:
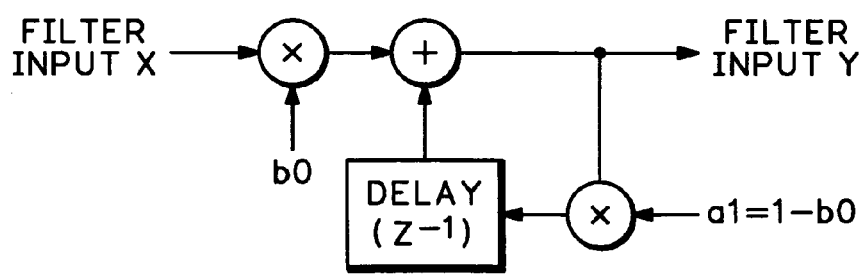
FIG. 8 is a block diagram view of a tunable IIR filter used as an adaptive filter building block.

For K2T only the portions most pertinent to the horizontal dimension, including adaptation and masking, are used. These portions are simplified as shown in the following processing of the 2T4 SD pulse, see FIGS. 6-8, along with a variable filter control due to the viewing distance and other factors which set a visual spatial sample rate as described in U.S. Patent Publication No. 2003-0031281-A1.

EXAMPLE

Human Vision System Masking Model: Spatial Processing of 2T4 Pulse
Maxt = floor(Samples) − 1     Maxt = $1.023 \times 10^3$     n = 0, . . . , Maxt
Forward filtering (based on 32 samples per visual degree):
samplesPerVisualDegree = Maxt/WidthViewingAngle = 50.74104     R = 1
R = samplesPerVisualDegree/32 = 1.58566
K1sc = 0.67         K2sc = 0.00067     length(T2PulseData) = $1.024 \times 10^3$
K1ss = 0.225        K2ss = 0.00225
b0C(lum) = K1sc + K2sc*lum     b0(a1) = 1−a1
b0S(lum)$_n$ = K1ss + K2ss*lum
lightIn$_n$ = T2PulseData$_n$*100 + 0
pole(z, R) = $\{z^{-1}(1 − R^{-1}) + 1 + R^{-1}\}/\{z^{-1}(1 + R^{-1}) + 1 − R^{-1}\}$     pole(.5, R) = 0.6526
(RefCenterFilter$_{n+1}$     )
(                          )=
(RecSurroundFilter$_{n+1}$)
(B0(pole(1 − b0C(RefCenterFilter$_n$),R))lightIn$_{\text{Maxt}-n}$ + pole(1 − b0C(RefCenterFilter$_n$),R)RefCenterFilter$_n$     )
(                                                                                                                                              )
(B0(pole(1 − b0S(RefSurroundFilter$_n$), R))lightIn$_{\text{Maxt}-n}$ + pole(1 − b0S(RefSurroundFilter$_n$),R)RefSurroundFilter$_n$)
     RevRefCF = RefCenterFilter         RevRefSF = RefSurroundFilter
(RefCenterFilter$_{n+1}$     )
(                          )=

-continued (RefSurroundFilter$_{n+1}$)
(b0(pole(1 − b0C(RefCenterFilter$_n$), R))RevRefCF$_{Maxt−n}$ + pole(1 − b0C(RefCenterFilter$_n$), R)RefCenterFilter$_n$)
(                                                                                                                    )
(b0(pole(1 − b0S(RefSurroundFilter$_n$), R))RevRefSF$_{Maxt−n}$ + pole(1 − b0S(RefSurroundFilter$_n$), R)RefSurroundFilter$_n$)

As shown input parameters for the particular video format include T, aspect ratio, samples per line and sample rate. From these parameters a light pulse is simulated (12) corresponding to HAD=T. Also from these parameters a variable rate recursive filter 14 according to U.S. Patent Publication No. 2003-0031281-A1 controls nominal filter coefficients for a modified one-dimensional spatial filter 16 of a single human vision system model shown in FIG. 7, which is derived from the multi-dimensional spatial filter shown in FIG. 6 and described in allowed U.S. patent application Ser. No. 09/858,775 together with the adaptive filter building block shown in FIG. 8. The filtered output is then curve fit (18) to a human vision mask response, using an algorithm such as a least mean squared error (LSME) method, to produce the graticule parameters for the particular video format.

Figure 1:
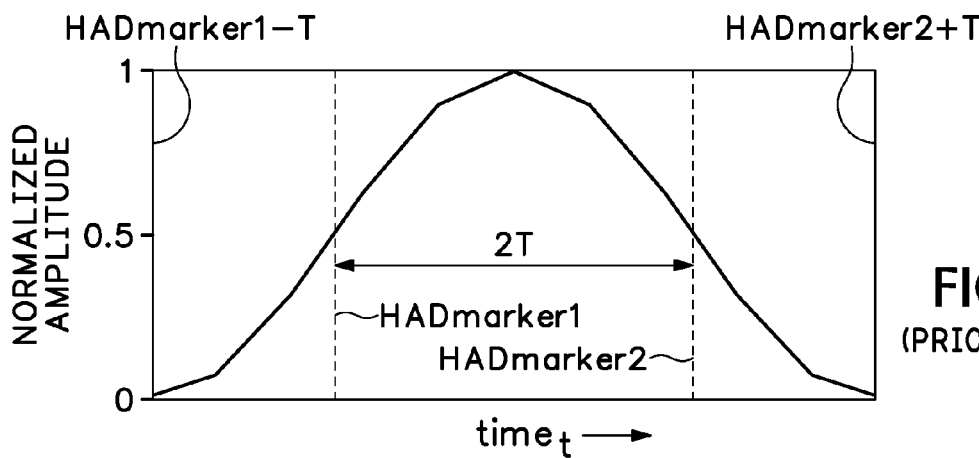
FIG. 1 is a graphic view of a 2T pulse according to the prior art where the half amplitude duration (HAD) is 2 times T.
Figure 9:
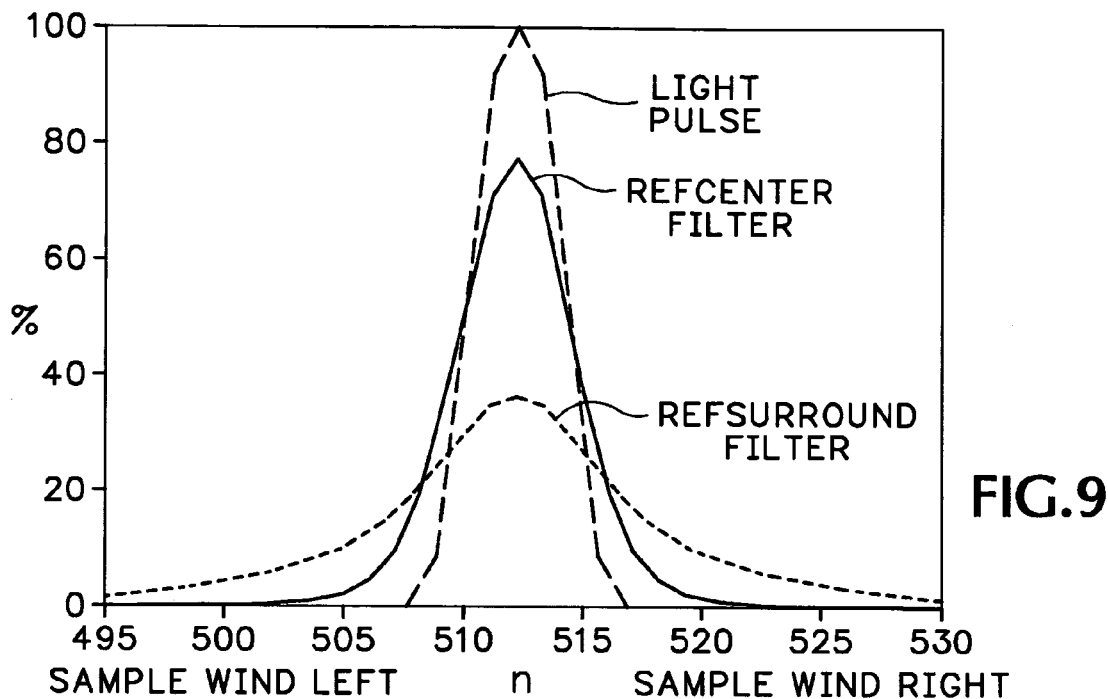
FIG. 9 is a graphic view of a light pulse impulse and of human vision masking model reference center and surround filter responses.
Figure 10:
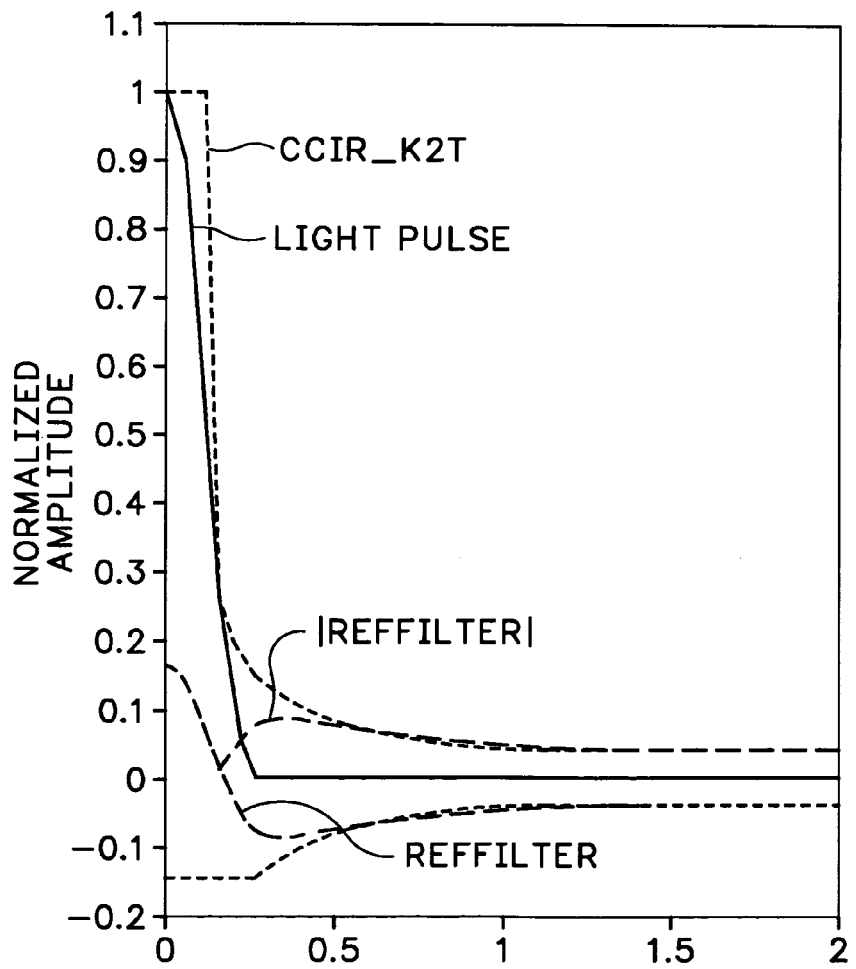
FIG. 10 is a graphic view of masking accounted for by just a differential reference filter.

The reference center filter 20' and reference surround filter 22' responses are used as differential inputs (26, 28) (FIG. 7), as shown graphically in FIG. 9, and compared with the corresponding differential test input—see FIG. 1 of U.S. Patent Publication No.2003-0152284-A1. FIG. 10 shows how much of the masking is accounted for by the difference between reference center and surround alone.

Figure 11:
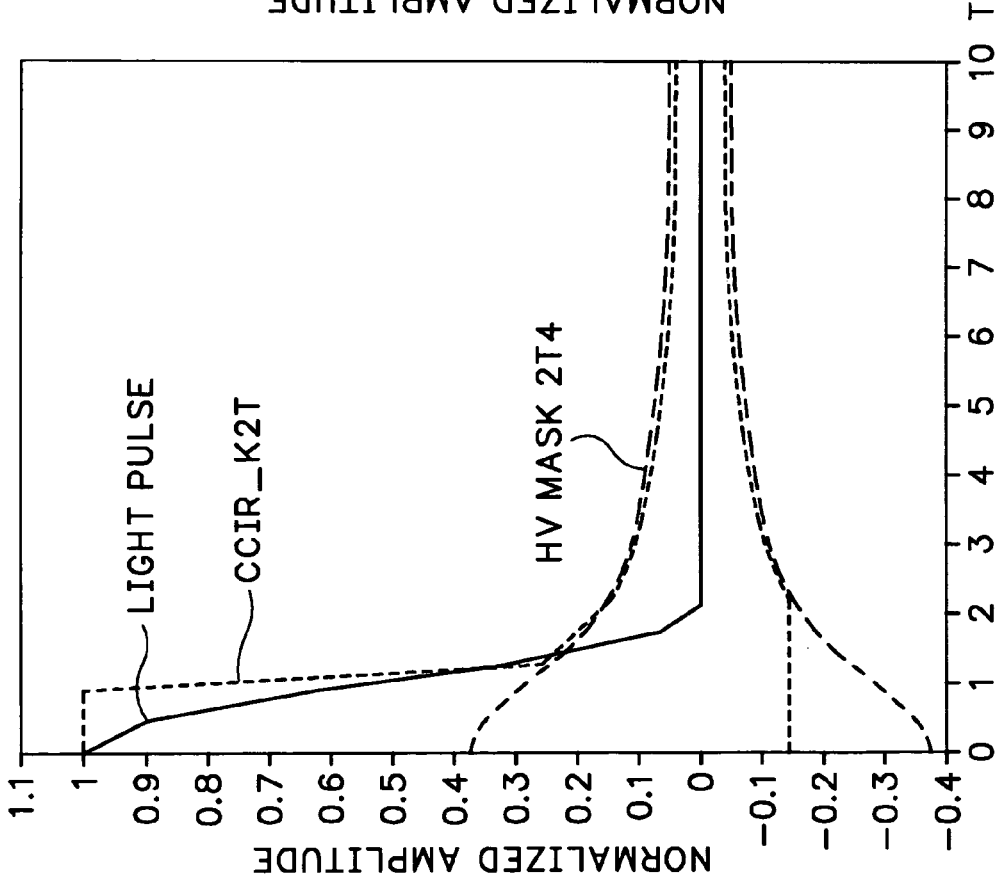
FIG. 11 is a graphic view of a good fit of predicted masking to an existing standard definition (SD) graticule scaled to an SD T.
Figure 13:
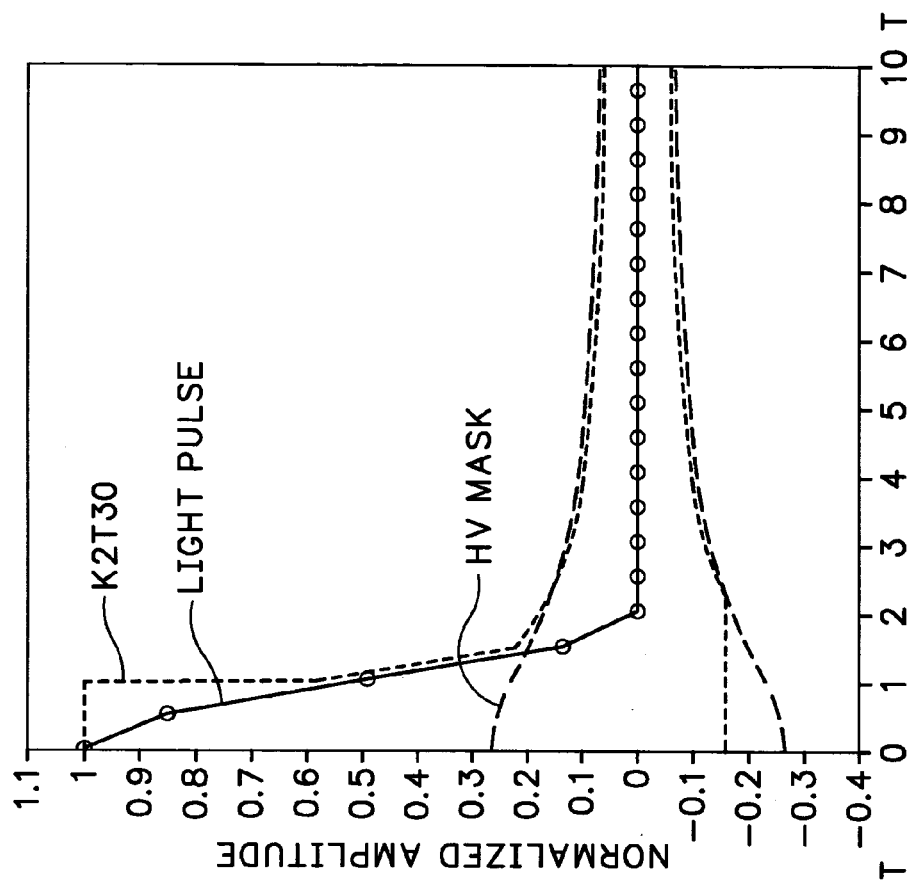
FIG. 13 is a graphic view of a new graticule summarized for a 1080i video format according to the present invention.
Figure 14:
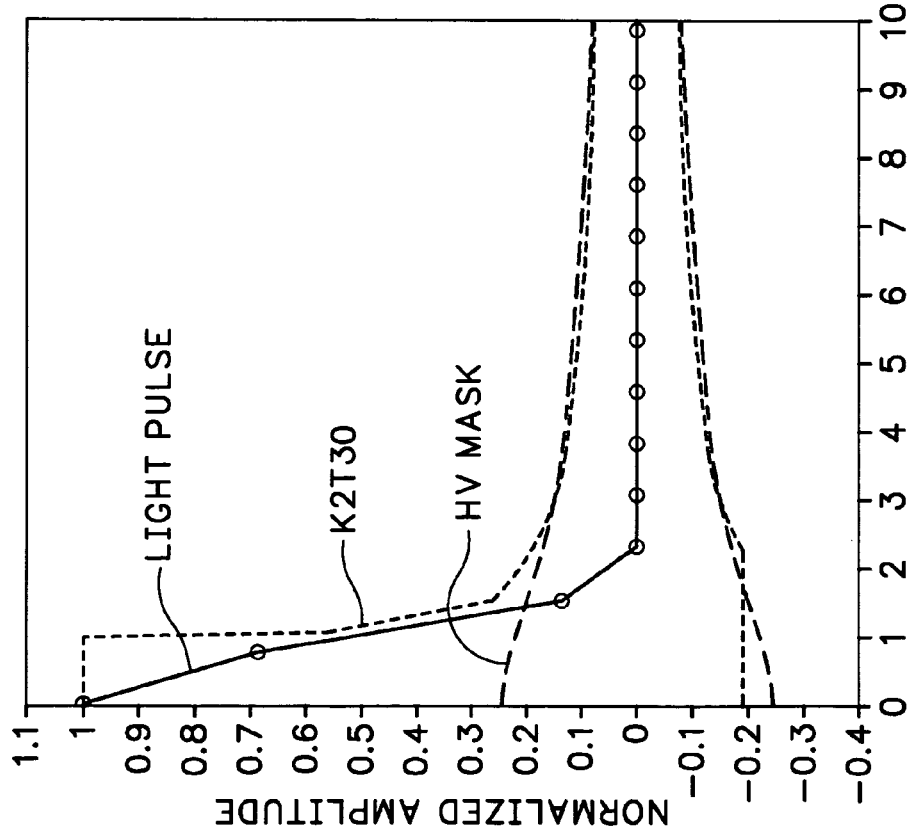
FIG. 14 is a graphic view of a new graticule summarized for a 720p video format according to the present invention.
Figure 16:
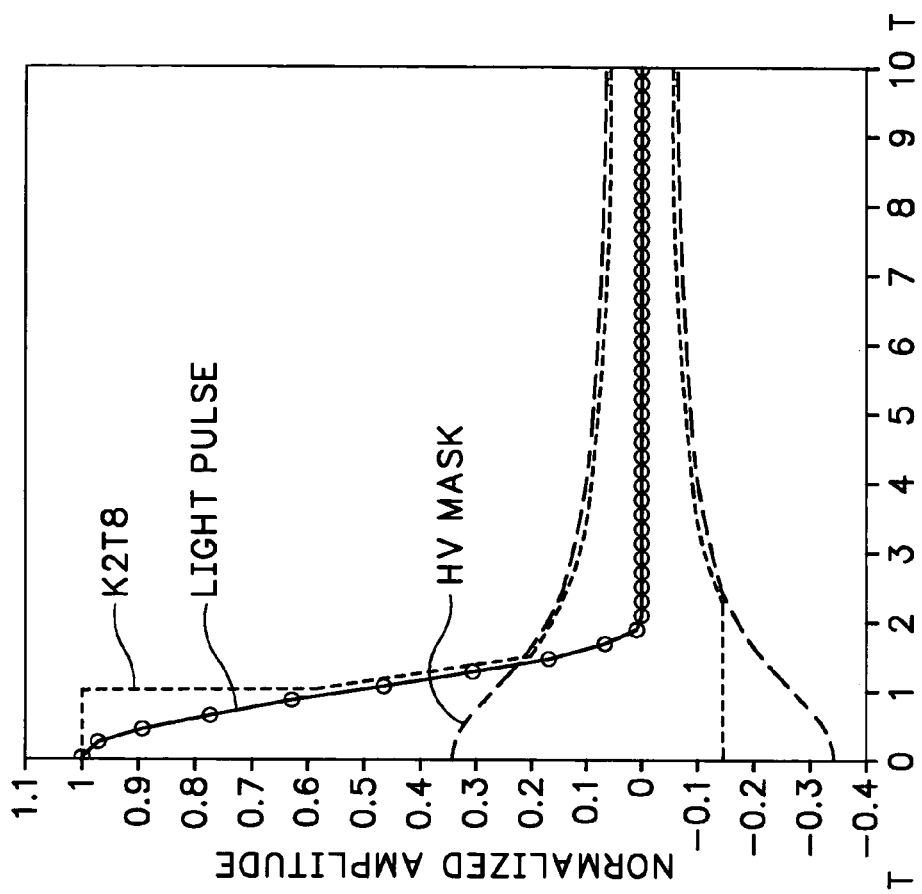
FIG. 16 is a graphic view of a new graticule summarized for a 480p video format according to the present invention.
Figure 15:
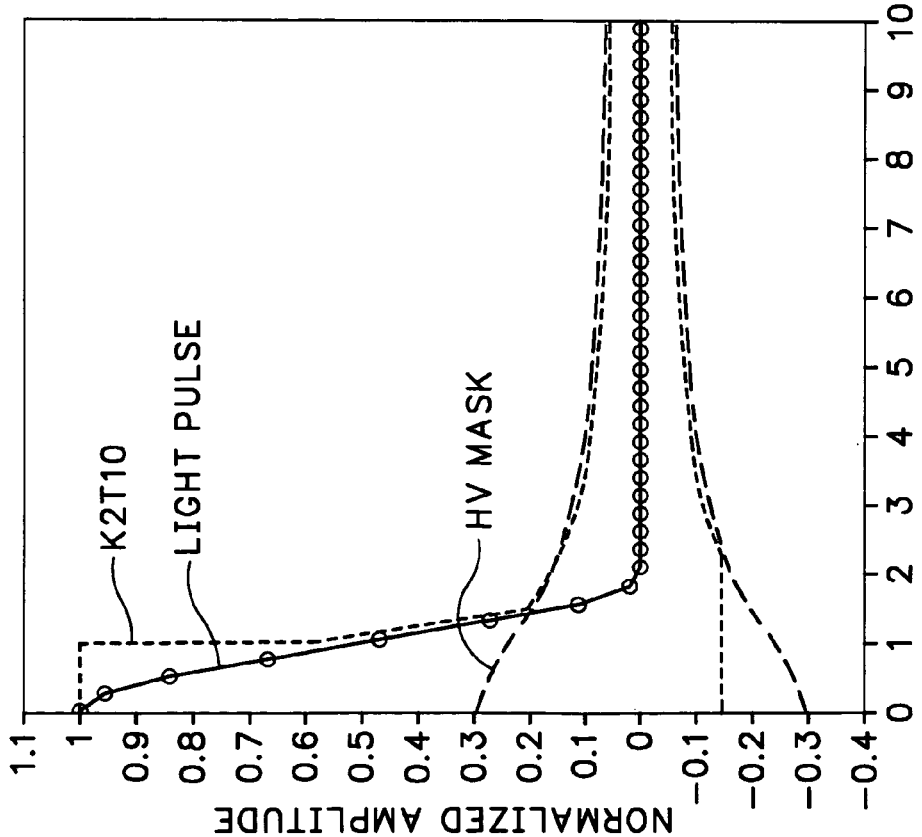
FIG. 15 is a graphic view of a new graticule summarized for a 576p video format according to the present invention.

This is simplified by approximating the dominant behavior of the system given the pulse input. The entire process is approximated with the following simple combination of the reference and surround filter responses, as shown in FIG. 11:

HVscale=0.0055 hvmask2T4$_n$=(RefSurroundFilter$_n$+RefCenterFilter$_n$*0.33)*HVscale+Kfact

Figure 12:
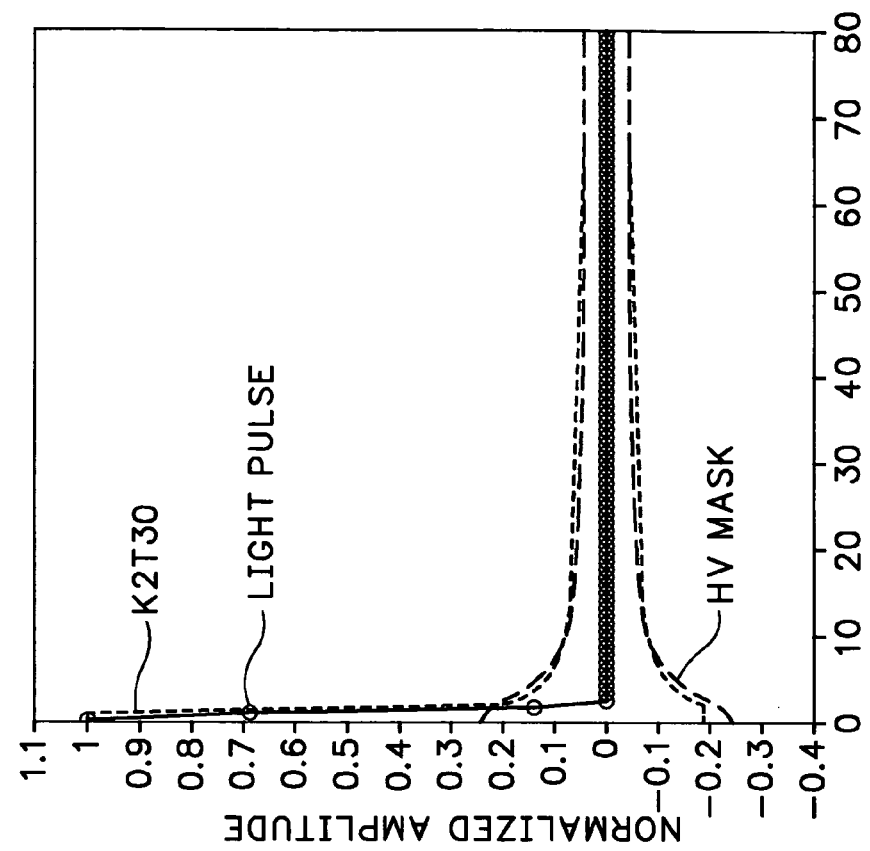
FIG. 12 is a graphic view of a new graticule for high definition (HD) using a human vision masking prediction and HD 2T pulse according to the present invention.

Using the same simplified human vision masking model, the 2T30 pulse for HD is applied and the parameterized graticule of CCIR 567 is modified to fit the human vision mask. This simplifies the graticule design to the specification of a few key parameters of an existing standard in order to apply it to new video formats. Finally a simple graticule equation is "curve-fit" to this human vision mask response using the LMSE method. The resulting parameters of the graticule are all that is needed to specify a graticule for a new video format, such as that shown for HD in FIG. 12 where the new graticule uses human vision masking prediction and the HD 2T pulse.

| Derivation of a 2T30 Graticule: | | |
|---|---|---|
| Kfact = 0.04 | T = 0.01667 | K0 = Kfact |
| Let r represent time | K = Kfact br1 = 1 br2 = 1.5 inters = 0.22 | |
| normalized by T: | d = 1 | flatBreak = 60 |

| Graticule Criteria: | |
|---|---|
| Interval (t value range) | Graticule Amplitude |
| −T to T | 1 |
| T to 1.5T | linear fit from 1 to curve value at 1.5T |
| 1.5T to flatBreak | K + C/t (C chosen for LSE over 2T to flatBreak) ≥ flatBreak |
| | (very far from pulse) constant |
| | (K$_{fact}$ = K) to fit human vision at flatBreak |

-continued

| Curve Fit (using LSME): | $\epsilon = 10^{-20}$ |
|---|---|
| | gratCurve(C, r) = K(d + C/(r + $\epsilon$)) |
| | range(r) = if(r < 2, 0, if(r > 20, 0, 1) |
| | I = floor(flatBreak/r(i))   i = 0, . . . , I − 1 |
| | C = 0.4/K0   SE(C) = |
| | $\Sigma_i$(gratCurve(C, r2(i)) − |
| | hvmask2T30$_{i+nos}$)$^2$range(r(i)) |
| | C = 10   SE = function |
| | Given   SE(C) = 0 |
| | C = LSMEMinErr(C)   C = 8.43234 | vert(r, K) = if(r < 1, 0, if (r > br2, 0, 0.6 − (r − 1)2(0.6 − gratCurve(C, br2))))
curve(r, K, br2, flatBreak) = if(r > br2, if(r < flatBreak, gratCurve(C, r), 0), 0)
end(r, K) = if(r > flatBreak, K, 0)
pos2T30__Kfactor_grat(t) = top(t, K) + vert(t, K) + curve(t, K, br2, flatBreak) + end(t, Kfact)
neg2T30(t) = −pos2T30__Kfactor_grat(t)
neg2T30__Kfactor_grat(t) = if(t < 2.2, neg2T30(2.2), neg2T30(t))

Similarly the graticules for the following formats have been created using this method for the same nominal K of 4%. Even though slightly better curve fitting is possible by modifying the parameter, d, in some formats, for further simplicity d is kept constant at 1.0 so that only one parameter, C, need change for a fairly nice fit across the following formats:

| Format | T (HAD) | d | C |
|---|---|---|---|
| 1920 × 1080i, 16 × 9 | 16.67 ns | 1.0 | 8.43234 |
| 1250 × 720p, 16 × 9 | 16.67 ns | 1.0 | 6.6534 |
| 720 × 576p, 4 × 3 | 50.0 ns | 1.0 | 5.80994 |
| 720 × 480p, 4 × 3 | 62.5 ns | 1.0 | 5.64456 |
| 720 × 576i, 4 × 3 | 100.0 ns | 1.0 | 5.80994 |
| 720 × 480i, 4 × 3 | 125.0 ns | 1.0 | 5.64456 |

The respective graticules are shown in FIGS. 13-18.

For 1080i the 2T pulse graticule (FIG.13) summary is:

| For 1080i the 2T pulse graticule (FIG. 13) summary is: | | |
|---|---|---|
| BWof2TPulse2 = 30 MHz | nominalSampleRate2 = 74.128 MHz | T = 0/01667 |
| aspectRatio2 = 1.77778 | samplesPerLine2 = 1920 | HAD = 0.03333 |

Graticule Criteria:

| Interval (t value range) | Graticule Amplitude |
|---|---|
| −T to T | 1 |
| T to 1.5T (note that only |r| > 2T is used) | linear fit from 1 to curve value at 1.5T |

-continued

| | |
|---|---|
| 1.5T to flatBreak | K + C/t (C chosen for LSE over 2T to flatBreak) |
| ≧flatBreak | constant to fit human vision at flatBreak |
| gratCurve(C, r) = K*(d + C/r) | d = 1    C = 8.43234    K = 0.04 |

For 720p new graticule (FIG. 14) summary is:

| | | |
|---|---|---|
| BWof2TPulse2 = 30 MHz | nominalSampleRate2 = 74.128 MHz | T = 0.01667 |
| aspectRatio2 = 1.77778 | samplesPerLine2 = 1280 | HAD = 0.03333 |

Graticule Criteria:

| Interval (t value range) | Graticule Amplitude |
|---|---|
| −T to T | 1 |
| T to 1.5T (Note that only \|r\| > 2T is used) | linear fit from 1 to curve value at 1.5T |
| 1.5T to flatBreak | K + C/t (C chosen for LSE over 2T to flatBreak) |
| ≧flatBreak | constant to fit human vision at flatBreak |
| gratCurve(C, r) = K(D + C/r) | d = 1    C = 6.6534    K = 0.4 |

For 576p the new graticule (FIG. 15) summary is:

| | | |
|---|---|---|
| BWof2TPulse2 = 10 MHz | nominalSampleRate2 = 27 MHz | T = 0.05 |
| aspectRatio2 = 1.33333 | samplesPerLine2 = 720 | HAD = 0.1 |

Graticule Criteria:

| Interval (t value range) | Graticule Amplitude |
|---|---|
| −T to T | 1 |
| T to 1.5T | linear fit from 1 to curve value at 1.5T |
| 1.5T to flatBreak | K + C/r (C chosen for LSE over 2T to flatBreak) |
| ≧flatBreak | constant to fit human vision at flatBreak |
| gratCurve(C, r) = K(d + C/r) | d = 1    C = 5.80994    K = 0.04 |

For 480p the new graticule (FIG. 16) summary is:

| | | |
|---|---|---|
| BWor2TPulse2 = 8 MHz | nominalSampleRate2 = 27 MHz | T = 0.0625 |
| aspectRatio2 = 1.33333 | samplesPerLine2 = 720 | HAD = 0.125 |

Graticule Criteria:

| Interval (t value range) | Graticule Amplitude |
|---|---|
| −T to T | 1 |
| T to 1.5T | linear fit from 1 to curve value at 1.5T |
| 1.5T to flatBreak | K + C/t (C chosen for LSE over 2T to flatBreak) |
| ≧flatBreak | constant to fit human vision at flatBreak |
| gratCurve(C, r) = K(d + C/r) | d = 1    C = 5.97377    K = 0.04 |

For 576i the new graticule (FIG. 17) summary is:

| | | |
|---|---|---|
| BWof2TPulse2 = 5 MHz | nominalSampleRate2 = 13.5 MHz | T = 0.1 |
| aspectRatio2 = 1.33333 | samplesPerLine2 = 720 | HAD = 0.2 |

Graticule Criteria:

| Interval (t value range) | Graticule Amplitude |
|---|---|
| −T to T | 1 |
| T to 1.5T | linear fit from 1 to curve value at 1.5T |
| 1.5T to flatBreak | K + C/t (C chosen for LSE over 2T to flatBreak) |
| ≧flatBreak | constant to fit human vision at flatBreak |
| gratCurve(C, r) = K(d + C/r) | d = 1    C = 5.80994    K = 0.04 |

And for 480i the new graticule (FIG. 18) summary is:

| | | |
|---|---|---|
| BWof2TPulse2 = 4 MHz | nominalSampleRate2 = 13.5 MHz | T = 0.125 |
| aspectRatio2 = 1.33333 | samplesPerLine2 = 720 | HAD = 0.25 |

Graticule Criteria:

| Interval (t value range) | Graticule Amplitude |
|---|---|
| −T to T | 1 |
| T to 1.5T | linear fit from 1 to curve value at 2T |
| 1.5T to flatBreak | K + C/t (C chosen for LSE over 2T to flatBreak) |
| ≧flatBreak | constant to fit human vision at flatBreak |
| gratCurve(C/r) = K(d + C/r) | d = 1    C = 5.97377    K = 0.04 |

Although for illustration purposes the graphs shown in FIGS. 12-18 show a separation between the graticule and the HV mask from 1.5T outwards, in actuality the graticule is defined by the HV mask equations given above for the Human Vision System Masking Model.

Thus the present invention provides K2T measurement of video signals as a subjectively correlated objective measurement for all video formats by using a single graticule design with only one unique parameter per video format.

What is claimed is:

1. A method of generating a graticule for K2T measurement of a video signal comprising the steps of:
   setting the graticule to a normalized value of one for a first range from −T to +T, where T is a function of a video format for the video signal;
   setting the graticule to a normalized value determined by a human vision masking model algorithm for a third range from −1.5T to −flatBreak and +1.5T to +flatBreak, flatBreak being a point beyond which the graticule has a constant normalized value; and setting the graticule to a normalized value determined by a linear curve fit over a second range from −T to −1.5T and T to +1.5T between the first and third ranges.

2. The method as recited in claim 1 wherein the human vision masking model algorithm comprises a predicted mask of normalized values determined according to the equation: $K+C/t$ where K is a desired K factor, t is a normalized time increment related to T, and C is a variable determined by the video format.

* * * * *